(12) United States Patent
Hong et al.

(10) Patent No.: US 11,705,962 B2
(45) Date of Patent: Jul. 18, 2023

(54) MARITIME COMMUNICATION SYSTEM BASED ON LOW EARTH ORBIT SATELLITE AND UNMANNED AERIAL VEHICLE

(71) Applicant: UNIVERSITY-INDUSTRY COOPERATION GROUP OF KYUNG HEE UNIVERSITY, Yongin-si (KR)

(72) Inventors: Choong Seon Hong, Yongin-si (KR); Hassansheikh Salman, Suwon-si (KR); Seok Won Kang, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 349 days.

(21) Appl. No.: 17/005,988

(22) Filed: Aug. 28, 2020

(65) Prior Publication Data

US 2021/0159970 A1 May 27, 2021

(30) Foreign Application Priority Data

Nov. 25, 2019 (KR) .......................... 10-2019-0152528
Aug. 28, 2020 (KR) .......................... 10-2020-0109438

(51) Int. Cl.
*H04B 17/40* (2015.01)
*H04B 7/06* (2006.01)
(Continued)

(52) U.S. Cl.
CPC .......... *H04B 7/18504* (2013.01); *B60L 53/12* (2019.02); *B60L 53/305* (2019.02);
(Continued)

(58) Field of Classification Search
CPC .............. H04B 7/18504; H04B 7/0413; H04B 7/1851; B60L 53/12; B60L 53/305;
(Continued)

(56) References Cited

U.S. PATENT DOCUMENTS

| 5,579,285 A | * | 11/1996 | Hubert | .................... G01S 11/14 367/133 |
| 8,135,338 B1 | * | 3/2012 | Gelon | ................ H04B 7/18521 455/13.1 |

(Continued)

FOREIGN PATENT DOCUMENTS

| JP | 2018-74253 A | 5/2018 |
| JP | 2019-166961 A | 10/2019 |

(Continued)

OTHER PUBLICATIONS

Liman Himawan Kusumah, Knowledge Growing System Implementation on Design of Unmanned Aerial Vehicle in Maritime Security Monitoring, Apr. 11-13, 2019 (Year: 2019).*

(Continued)

*Primary Examiner* — Tanmay K Shah
(74) *Attorney, Agent, or Firm* — Sughrue Mion, PLLC

(57) ABSTRACT

The present disclosure relates to a maritime communication system based on low earth orbit satellites and an unmanned aerial vehicle. The maritime communication system according to one embodiment may include one or more maritime users, one or more satellites connected to a network operator, and an unmanned aerial vehicle (UAV) for relaying communication between the maritime users and the satellites.

10 Claims, 6 Drawing Sheets

(51) Int. Cl.
*H04B 7/185* (2006.01)
*H04B 7/0413* (2017.01)
*H04W 4/029* (2018.01)
*H04W 4/40* (2018.01)
*B64C 39/02* (2023.01)
*B60L 53/12* (2019.01)
*B60L 53/30* (2019.01)
*B60L 58/12* (2019.01)
*B64G 1/10* (2006.01)
*H04W 84/06* (2009.01)
*B64U 10/13* (2023.01)
*B64U 50/19* (2023.01)
*B64U 50/34* (2023.01)
*B64U 101/20* (2023.01)

(52) U.S. Cl.
CPC ............ *B60L 58/12* (2019.02); *B64C 39/024* (2013.01); *B64G 1/1007* (2013.01); *H04B 7/0413* (2013.01); *H04B 7/1851* (2013.01); *H04W 4/029* (2018.02); *H04W 4/40* (2018.02); *B60L 2200/10* (2013.01); *B64U 10/13* (2023.01); *B64U 50/19* (2023.01); *B64U 50/34* (2023.01); *B64U 2101/20* (2023.01); *B64U 2201/00* (2023.01); *H04W 84/06* (2013.01)

(58) Field of Classification Search
CPC .. B60L 58/12; B60L 2200/10; B60L 2200/32; B60L 53/66; B60L 2260/32; B60L 53/57; B64C 39/024; B64C 2201/027; B64C 2201/042; B64C 2201/066; B64C 2201/122; B64C 2201/14; B64G 1/1007; B64G 1/007; H04W 4/029; H04W 4/40; H04W 84/06; H04W 88/04; Y02T 90/12; Y02T 90/16; Y02T 10/70; Y02T 10/7072; Y02T 90/14

USPC ........................................................ 375/211
See application file for complete search history.

(56) References Cited

U.S. PATENT DOCUMENTS

| | | | | |
|---|---|---|---|---|
| 2012/0044710 | A1* | 2/2012 | Jones | B64C 39/024 362/470 |
| 2012/0320510 | A1* | 12/2012 | Varga | H02J 7/32 361/679.03 |
| 2015/0236778 | A1* | 8/2015 | Jalali | H04B 7/18541 370/316 |
| 2016/0204866 | A1* | 7/2016 | Boroson | H04B 10/61 398/97 |
| 2017/0155443 | A1* | 6/2017 | Haziza | G01S 5/0263 |
| 2017/0301987 | A1* | 10/2017 | Mack | H01Q 3/08 |
| 2018/0068567 | A1* | 3/2018 | Gong | H04W 4/022 |
| 2021/0136600 | A1* | 5/2021 | Le | H04W 64/006 |

FOREIGN PATENT DOCUMENTS

| | | |
|---|---|---|
| KR | 10-2015-0117627 A | 10/2015 |
| KR | 10-1661861 B1 | 9/2016 |
| KR | 10-2046143 B1 | 12/2019 |

OTHER PUBLICATIONS

Office Action dated Jun. 7, 2022 issued by the Korean Patent Office in Korean Application No. 10-2020-0109438.

Communication dated Mar. 21, 2022, issued by the Korean Patent Office in counterpart Korean Application No. 10-2020-0109438.

\* cited by examiner

[FIG. 1]
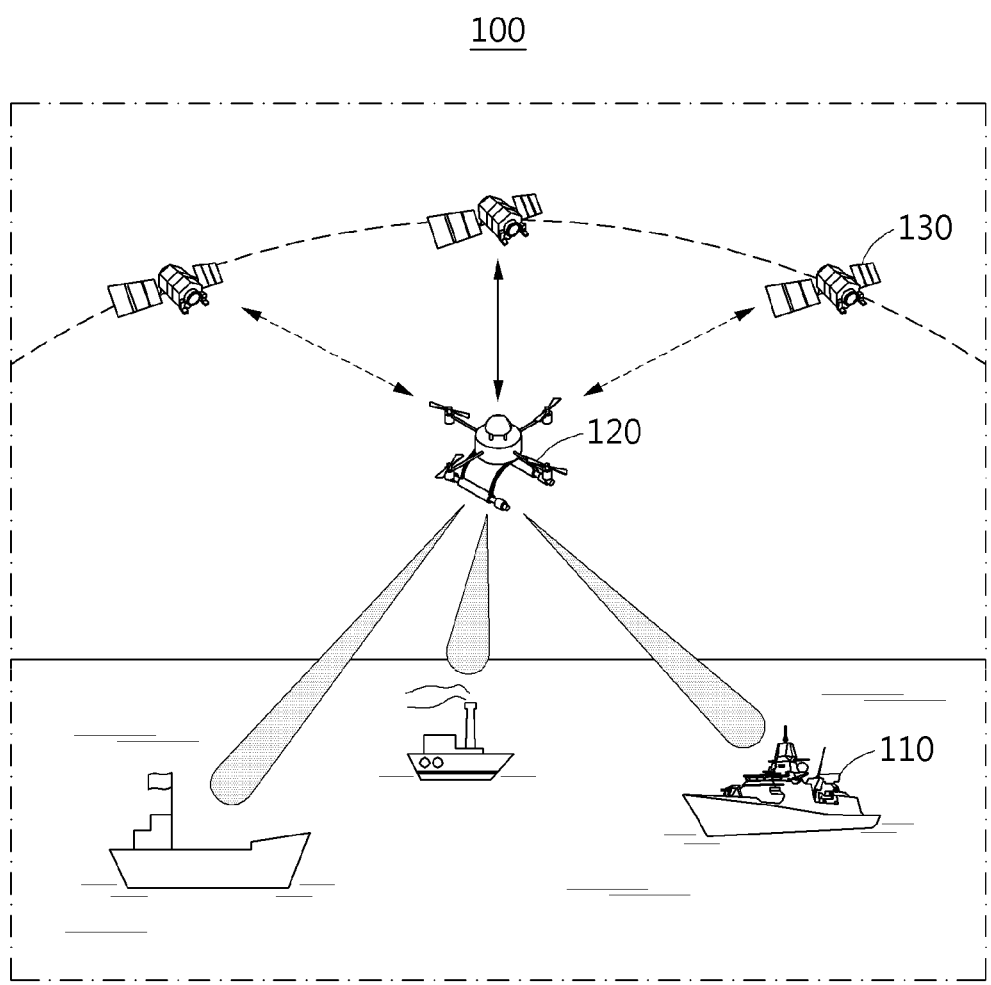

[FIG. 2]
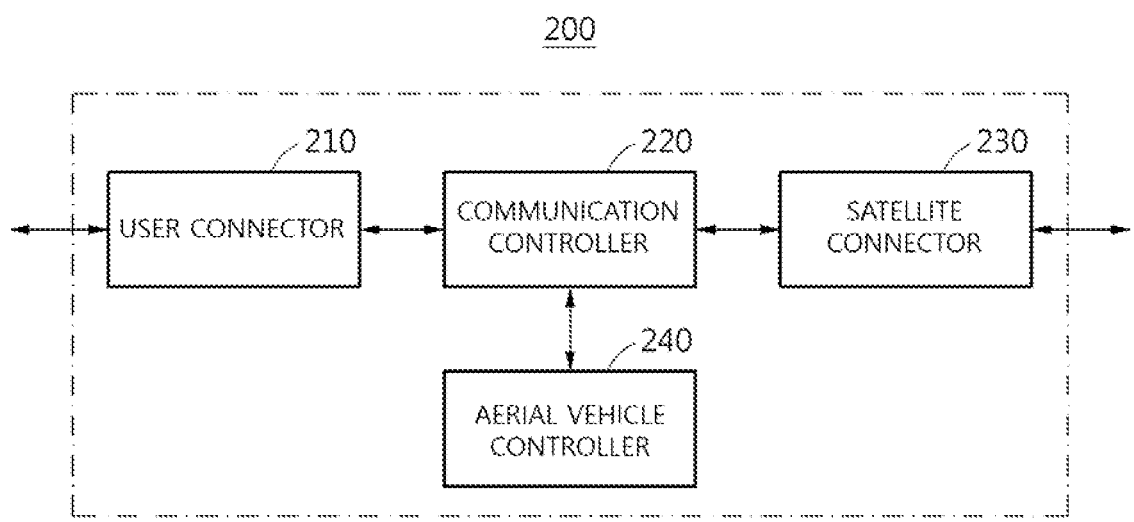

[FIG. 3]
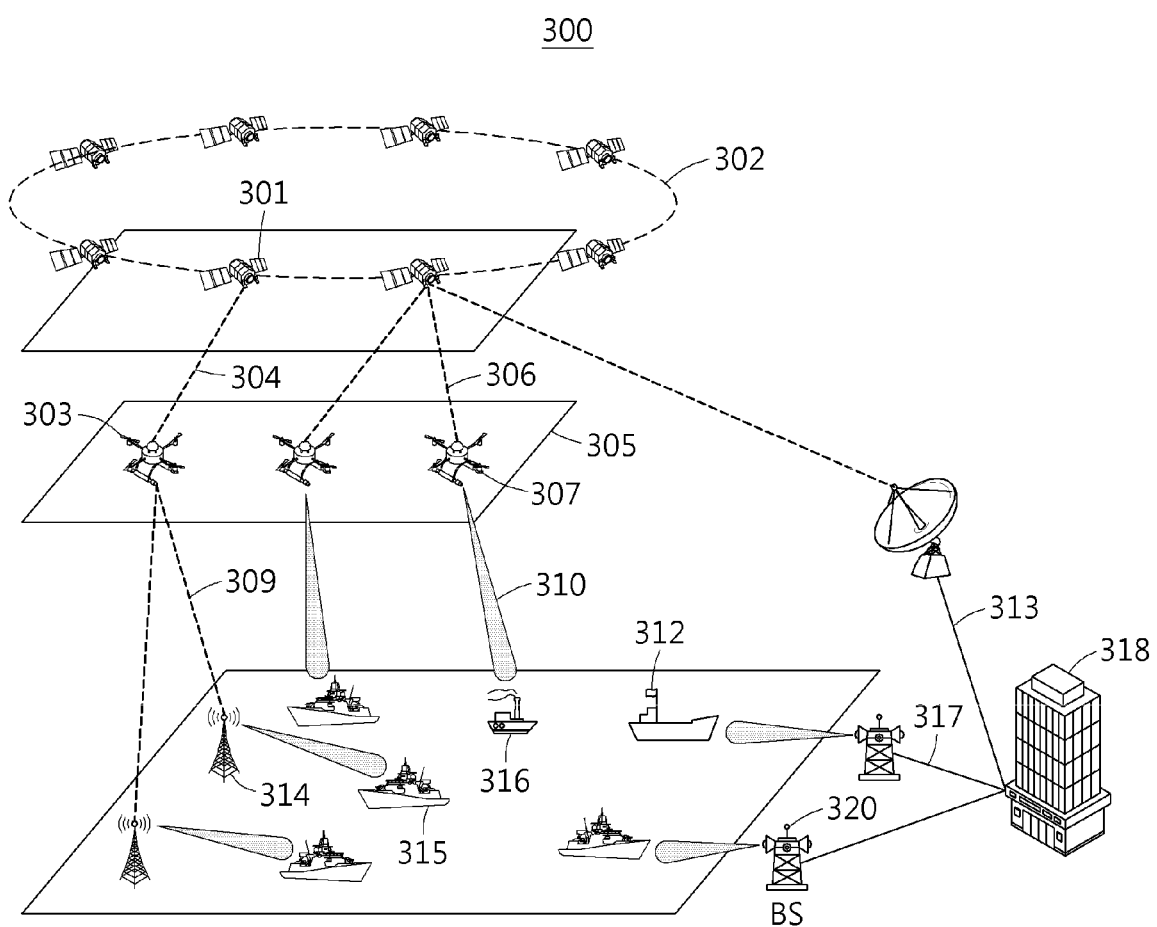

[FIG. 4A]
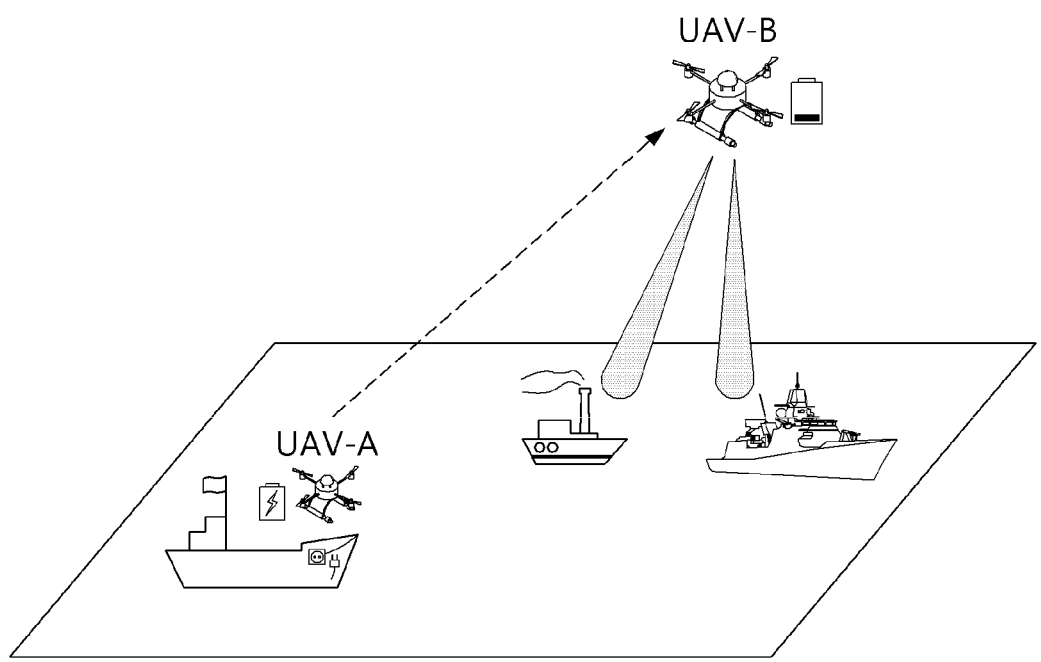

【FIG. 4B】
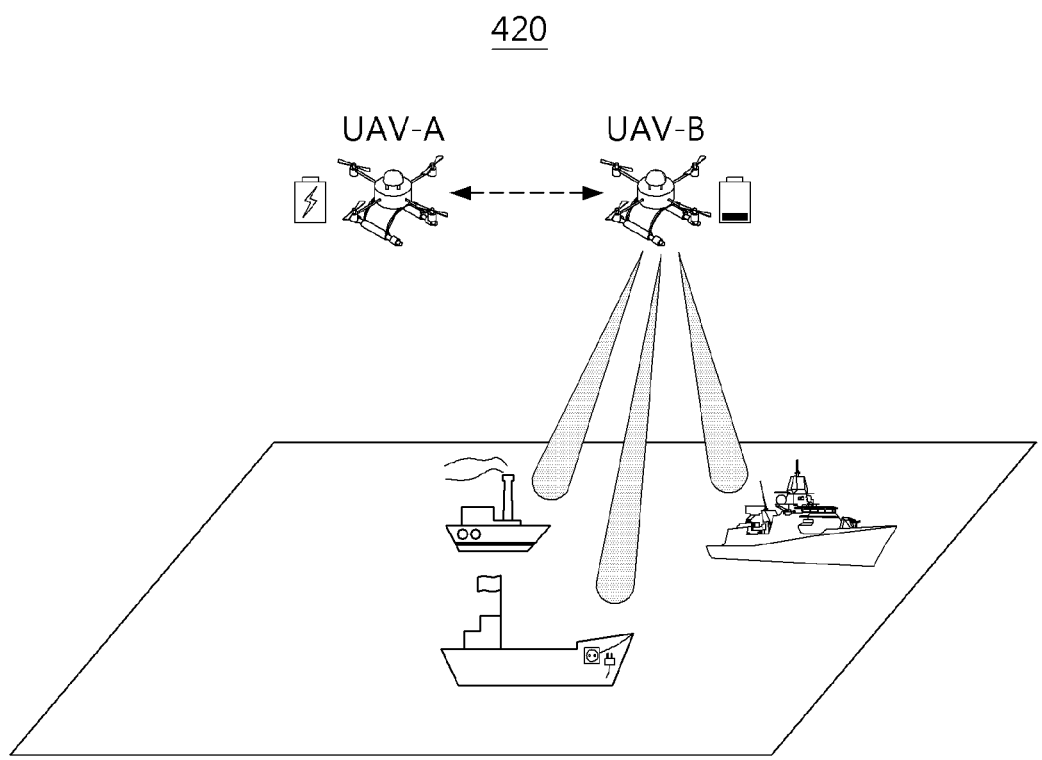

【FIG. 4C】
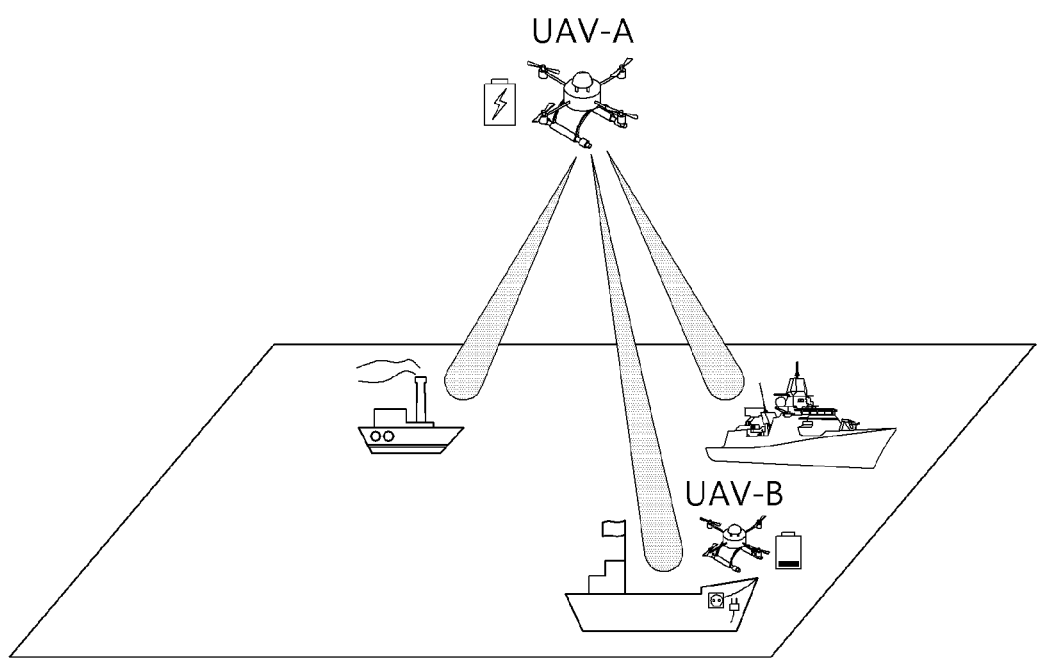

MARITIME COMMUNICATION SYSTEM BASED ON LOW EARTH ORBIT SATELLITE AND UNMANNED AERIAL VEHICLE

CROSS-REFERENCE TO RELATED APPLICATION

This application claims priority to Korean Patent Application No. 10-2019-0152528, filed on Nov. 25, 2019, and Korean Patent Application No. 10-2020-0109438, filed on Aug. 28, 2020, in the Korean Intellectual Property Office, the disclosures of each of which are incorporated herein by reference.

BACKGROUND OF THE DISCLOSURE

Field of the Disclosure

The present disclosure relates to a maritime communication system, and more particularly, to a maritime communication system based on low earth orbit (LEO) satellites and an unmanned aerial vehicle (UAV).

Description of the Related Art

Expanding the coverage of telecommunication networks worldwide is a major goal of next-generation networks. Accordingly, the coverage of terrestrial communication has been expanded as desired, but in the case of maritime communication, a communication system for efficient processing data traffic has not yet been built.

As deep-sea projects (for example, underwater research, marine life research, marine tourism, etc.) are actively conducted, demand for maritime communication systems is rapidly increasing.

Specifically, as maritime operations related to the construction of offshore drilling platforms, offshore rescue, emergency operations, and offshore aquaculture increase, there is an increasing demand for a maritime communication system satisfying maritime user requirements, such as high-connectivity, low latency, and high throughput.

Conventional maritime communication systems use satellite services or land base stations for communication. International maritime satellites (Inmarsat) responsible for maritime communication are inefficient due to a very low data transfer rate for applications.

Besides, LEO satellites are emerging as a good system for global coverage, but the mobile nature of LEO satellites, makes it difficult for maritime users to the established smooth connection without a glitch. Moreover, two types of maritime user equipment (MUE) are available in sea waters i.e., high-end MUE and low-end MUE. High-end MUE can directly connect with the LEO satellite due to high antenna gain, but low-end MUE cannot directly access the satellite services due to low-antenna gain. Therefore, the unmanned aerial vehicle, is deployed for that low-end MUE stable connectivity. In the rest of the details, maritime users will be considered as low-end MUE. Low-end MUEs can be considered as seamen, fishers, and offshore platform workers, etc.

Besides, due to the high latency caused by communication between LEO satellites and maritime users, maritime users have difficulty in acquiring sensitive information within a short time.

RELATED ART DOCUMENTS

Patent Documents

Korean Patent No. 10-1661861, "MONITORING UAV AD-HOC NETWORK FOR PS-LTE DISASTER SAFETY NETWORK"

Korean Patent Application Publication No. 10-2046143, "METHOD AND SYSTEM FOR UNMANNED MONITORING OF DRONE CAPABLE OF WIRELESS CHARGING THROUGH CHARGING STATION"

SUMMARY OF THE DISCLOSURE

Therefore, the present disclosure has been made in view of the above problems, and it is an object of the present disclosure to provide a maritime communication system capable of easily integrating terrestrial communication and maritime communication using low earth orbit satellites and an unmanned aerial vehicle.

It is another object of the present disclosure to provide a maritime communication system that enables low-latency communication between a maritime user and satellites through relaying using an unmanned aerial vehicle.

It is yet another object of the present disclosure to provide a maritime communication system capable of easily charging an unmanned aerial vehicle wirelessly in a wireless manner at sea.

In accordance with one aspect of the present disclosure, provided is a maritime communication system including one or more maritime users; one or more satellites connected to a network operator; and an unmanned aerial vehicle (UAV) for relaying communication between the maritime users and the satellites.

According to one aspect of the present disclosure, the maritime users may include ships private yacht, and fishermen's boat located at sea, and the satellites may include LEO satellites positioned at a low altitude of 1,000 km to 1,400 km.

According to one aspect of the present disclosure, the unmanned aerial vehicle may monitor the status of communication between the maritime users and the satellites.

According to one aspect of the present disclosure, the unmanned aerial vehicle may receive location information of a user equipped with a charging station among the maritime users every preset period (due to predefined routes in the sea).

According to one aspect of the present disclosure, when the power of an equipped battery is less than or equal to a preset threshold, the unmanned aerial vehicle may fly to a location of the user (ship) equipped with a charging station based on the location information, and wireless charging of the unmanned aerial vehicle may be performed at the location.

In accordance with another aspect of the present disclosure, provided is an unmanned aerial vehicle of a maritime communication system, the unmanned aerial vehicle including a user connector for connecting one or more maritime users and a network; a satellite connector for connecting one or more satellites and the network; and a communication controller for relaying communication between the maritime users and the satellites and monitoring status of the relayed communication.

According to one aspect of the present disclosure, the user connector may be provided with a multiple-input and multiple-output (MIMO) directional antenna and may connect the maritime users and the network through the provided MIMO directional antenna.

According to one aspect of the present disclosure, the user connector may receive location information of a user equipped with a charging station among the maritime users every preset period.

According to one aspect of the present disclosure, the unmanned aerial vehicle may further include an aerial vehicle controller for generating a flight control signal for flight to a location corresponding to the location information when the power of an equipped battery is less than or equal to a preset threshold.

BRIEF DESCRIPTION OF THE DRAWINGS

The above and other objects, features, and other advantages of the present disclosure will be more clearly understood from the following detailed description taken in conjunction with the accompanying drawings, in which:

FIG. 1 is a drawing for explaining a maritime communication system according to one embodiment;

FIG. 2 is a block diagram for explaining an unmanned aerial vehicle included in a maritime communication system according to one embodiment;

FIG. 3 is a drawing showing an example of implementing a maritime communication system according to one embodiment; and FIGS. 4A to 4C are drawings for explaining a method of wirelessly charging an unmanned aerial vehicle included in a maritime communication system according to one embodiment.

DETAILED DESCRIPTION OF THE DISCLOSURE

Specific structural and functional descriptions of embodiments according to the concept of the present disclosure disclosed herein are merely illustrative to explain the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only to distinguish one constituent element from another constituent element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless specified otherwise in context. Also, terms such as "include" or "comprise" should be construed as denoting that a certain characteristic, number, step, operation, constituent element, component, or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

FIG. 1 is a drawing for explaining a maritime communication system according to one embodiment.

Referring to FIG. 1, a maritime communication system 100 according to one embodiment may easily integrate terrestrial communication and maritime communication using low earth orbit satellites and an unmanned aerial vehicle.

In addition, the maritime communication system 100 may relay communication between a maritime user and satellites with low latency using an unmanned aerial vehicle.

In addition, the maritime communication system 100 may easily wirelessly charge an unmanned aerial vehicle at sea.

To implement these functions, the maritime communication system 100 according to one embodiment may include one or more maritime users 110, an unmanned aerial vehicle (UAV) 120, and one or more satellites 130.

According to one aspect of the present disclosure, the maritime users 110 may include ships located at sea, and the satellites 130 may include LEO satellites positioned at a low altitude of 1,000 km to 1,400 km.

The satellites 130 according to one embodiment may be connected to a network operator.

For example, the network operator may be an organization responsible for network operation, and more specifically, may refer to a device such as a server that controls the maritime communication system 100 and provides communication services.

The unmanned aerial vehicle 120 according to one embodiment may relay communication between the maritime users 110 and the satellites 130.

According to one aspect of the present disclosure, the unmanned aerial vehicle 120 may monitor the status of communication between the maritime users 110 and the satellites 130.

For example, the unmanned aerial vehicle 120 may monitor the status of communication with the maritime users 110 and may optimize the utility of a network formed between the maritime users 110 and the unmanned aerial vehicle 120 based on the monitoring results.

Specifically, based on a free-space path loss value ($PL_{FS}$) between each of one or more maritime users and the unmanned aerial vehicle 120 constituting a network and the gain value ($g_i$) of a sub-carrier corresponding to the free space path loss value (PL) of each maritime user, the unmanned aerial vehicle 120 may maximize the utility of the network.

According to one aspect of the present disclosure, the unmanned aerial vehicle 120 may receive location information of a user equipped with a charging station among the maritime users 110 every preset period.

In addition, when the power of an equipped battery is less than or equal to a preset threshold, based on location information of a user equipped with a charging station, the unmanned aerial vehicle 120 may fly to the location of the user equipped with a charging station, and wireless charging of the unmanned aerial vehicle 120 may be performed using the charging station at the location of the user where the unmanned aerial vehicle 120 has arrived.

According to one aspect of the present disclosure, when the power of an equipped battery is less than or equal to a preset threshold, the unmanned aerial vehicle 120 may transmit a wireless charging request signal to a network operator and may receive a wireless charging feedback signal corresponding thereto. In addition, upon receiving the wireless charging feedback signal, the unmanned aerial vehicle 120 may fly to the location of a user equipped with a charging station.

Upon receiving a wireless charging request signal, the network operator may adjust the positions of unmanned aerial vehicles located within a preset distance from the unmanned aerial vehicle 120 that transmitted the wireless charging request signal, thereby minimizing a gap in communication relaying due to the absence of the unmanned aerial vehicle 120 that transmitted the wireless charging request signal.

In addition, when charging of the unmanned aerial vehicle 120 that transmitted a wireless charging request signal is completed, the network operator may adjust the positions of the charged unmanned aerial vehicle 120 and the unmanned aerial vehicles located within a preset distance from the charged unmanned aerial vehicle 120.

An example of wirelessly charging an unmanned aerial vehicle will be described in detail with reference to FIGS. 4A to 4C.

FIG. 2 is a block diagram for explaining an unmanned aerial vehicle included in a maritime communication system according to one embodiment.

That is, FIG. 2 shows an example of the unmanned aerial vehicle included in the maritime communication system described in FIG. 1. Thus, when describing the unmanned aerial vehicle with reference to FIG. 2, descriptions overlapping with those of FIG. 1 will be omitted.

Referring to FIG. 2, an unmanned aerial vehicle 200 according to one embodiment may include a user connector 210, a communication controller 220, a satellite connector 230, and an aerial vehicle controller 240.

The user connector 210 according to one embodiment may connect one or more maritime users and a network, and the satellite connector 230 according to one embodiment may connect one or more satellites and a network.

According to one aspect of the present disclosure, the maritime users may include ships located at sea, and the satellites may include low earth orbit (LEO) satellites positioned at a low altitude of 1,000 km to 1,400 km.

According to one aspect of the present disclosure, the user connector 210 may be provided with a multiple-input and multiple-output (MIMO) directional antenna, and may connect one or more maritime users and a network using the provided MIMO directional antenna.

Specifically, considering that the distribution density of maritime users at sea is low, the user connector 210 may perform communication with one or more maritime users through the MIMO directional antenna. That is, the user connector 210 may minimize communication interference between maritime users through coordinated communication between points based on the MIMO directional antenna.

The communication controller 220 according to one embodiment may relay communication between one or more maritime users and one or more satellites and monitor the status of the relayed communication.

For example, the communication controller 220 may monitor the status of communication with one or more maritime users and may optimize the utility of a network formed between the maritime users and an unmanned aerial vehicle based on the monitoring results.

Specifically, the communication controller 220 may calculate, using Equation 1 below, a free-space path loss value ($PL_{FS}$) between an N-th (N being a positive integer) maritime user and the unmanned aerial vehicle 200, which constitute a network.

$$PL_{FS} = -27.56 + 20*\log_{10}(f) + 20*\log_{10}(d_U) \qquad \text{[Equation 1]}$$

In Equation 1, f represents the carrier frequency of a channel, U represents a set of maritime users (U=1, 2, . . . , N), and $d_U$ represents a distance between an unmanned aerial vehicle and each maritime user.

In addition, the communication controller 220 may calculate, using Equation 2 below, the gain value ($g_i$) of a sub-carrier corresponding to the free space path loss value (PL) of each maritime user.

$$g_i = 10^{\left(\frac{-PL}{10}\right)} \qquad \text{[Equation 2]}$$

In addition, the communication controller 220 may maximize the utility of a network through a calculation using Equation 3 below based on the calculated gain value ($g_i$) of a sub-carrier and the calculated free space path loss value ($PL_{FS}$).

[Equation 3]

$$\text{Maximize}_P \ \log\left(\sum_{i \in U} g_i P_i\right), \qquad (a)$$

$$\text{subject to } P_i \leq \left(\frac{g_i}{\sum_{j \in U} g_j}\right) P_T, \ \forall i \in U, \qquad (b)$$

$$\sum_{i \in U} P_i = P_T, \ \forall i \in U, \qquad (c)$$

$$P_i > 0, \ \forall i \in U, \qquad (d)$$

In Equation 3, Equation 3 (a) is an equation associated with the maximization of the utility of a network, P represents a control parameter for each maritime user, and Equation 3 (b) shows constraint conditions for the proportional distribution of the power of each maritime user according to channel conditions.

Equation 3 (c) shows constraint conditions for securing the maximum power limit of the unmanned aerial vehicle 200, and Equation 3 (d) shows constraint conditions for a certain ratio of power that must be obtained to check the connectivity of each maritime user.

That is, the communication controller 220 may maximize the utility of a network through a calculation using Equation 3 based on the Karush-Kuhn-Tucker (KKT) conditions.

According to one aspect of the present disclosure, the user connector 210 may receive location information of a user equipped with a charging station among one or more maritime users every preset period.

In addition, when the power of an equipped battery provided in the unmanned aerial vehicle 200 is less than or equal to a preset threshold, the aerial vehicle controller 240 may generate a flight control signal for flight to a location corresponding to the location information of a user equipped with a charging station.

Specifically, when the power of a battery is less than or equal to a preset threshold, the communication controller 220 may transmit a wireless charging request signal to a network operator and may receive a wireless charging feedback signal corresponding thereto. Upon receiving a wireless charging feedback signal, the aerial vehicle controller 240 may generate a flight control signal to control the flight movement of the unmanned aerial vehicle 200.

In addition, upon receiving a wireless charging request signal, a network operator may adjust the positions of unmanned aerial vehicles located within a preset distance from the unmanned aerial vehicle 200 that transmitted the wireless charging request signal, thereby minimizing a gap in communication relaying due to absence of the unmanned aerial vehicle 200 transmitting a wireless charging request signal.

In addition, when charging of the unmanned aerial vehicle 200 transmitting a wireless charging request signal is completed, the network operator may adjust the positions of the charged unmanned aerial vehicle 200 and unmanned aerial vehicles located within a preset distance from the charged unmanned aerial vehicle 200 again.

FIG. 3 is a drawing showing an example of implementing a maritime communication system according to one embodiment.

FIG. 3 shows a specific example of implementing the maritime communication system according to one embodiment described with reference to FIGS. 1 and 2. Thus, when describing the maritime communication system with reference to FIG. 3, descriptions overlapping with those of FIGS. 1 and 2 will be omitted.

Referring to FIG. 3, the maritime communication system according to one embodiment may include one or more satellites 301, one or more maritime users 312, 315, and 316, and one or more unmanned aerial vehicles 303 and 307.

In addition, a maritime communication system 300 according to one embodiment may further include a network operator 318, one or more island base stations 314, and one or more offshore base stations 320.

For example, the satellites 301 may include low earth orbit (LEO) satellites positioned at a low altitude of 1,000 km to 1,400 km. That is, the satellites 301 may form a low earth orbit (LEO) satellite constellation.

In addition, the maritime users 312, 315, and 316 may include ships located at sea.

Specifically, the LEO satellites 301 may support globally expanding the coverage of communication using the network operator 318. However, due to the mobility characteristics of the LEO satellites 301, a time interval may be generated in communication with the maritime user 316, and thus continuous communication connection may be restricted.

However, the maritime communication system 300 according to one embodiment enables continuous communication between the LEO satellites 301 and the maritime user 316 through communication relaying using the unmanned aerial vehicle 307.

The unmanned aerial vehicle 307 may be an autonomous aerial vehicle and may directly provide a line of sight (LOS) connection to the maritime user 316, thereby performing a backhauling role.

The network operator 318 may provide a high-speed hand-off function for each of the maritime users 312, 315, and 316 based on GPS-based location information of the maritime users 312, 315, and 316.

That is, the network operator 318 may connect each of the maritime users 312, 315, and 316 to a corresponding relay means among the unmanned aerial vehicle 307, the island base stations 314, and the offshore base stations 320 based on location information of the maritime users 312, 315, and 316.

More specifically, the LEO satellites 301 are capable of orbiting around the world at altitudes of 1,000 km to 1,400 km.

An optical inter-satellite link (OISL) 302 is a channel for connecting an LEO satellite constellation that provides various applications, and the LEO satellites 301 may exchange time synchronization information with each other through the OISL 302 to improve orbit location information.

The relay unmanned aerial vehicle 303 may serve to relay communication between the island base stations 314 and the LEO satellites 301 to ensure connectivity with the base stations.

A relay backhaul link 304 may refer to a channel formed between the LEO satellites 301 and the relay unmanned aerial vehicle 303 (i.e., a backhaul) that relays communication between the island base stations 314 and the LEO satellites 301.

A high-altitude platform (HAP) 305 may refer to an area where the unmanned aerial vehicles 303 and 307 relay maritime communication services.

A service provider UAV backhaul link 306 may refer to a channel through which the service-providing unmanned aerial vehicle 307 that relays information to maritime users is connected to the LEO satellites 301.

The service-providing unmanned aerial vehicle 307 may ensure requests for communication connection and waiting time with an end-user (maritime user), and may provide various applications to a maritime user and monitor the sea.

A feeder link 308 may refer to a channel formed between the LEO satellites 301 and a feeder link station 311.

An island base station backhaul link 309 may refer to a channel formed between the relay unmanned aerial vehicle 303 hovering to provide services and the island base stations 314.

A beamforming signal 310 of the unmanned aerial vehicle 307 may refer to a beamforming signal transmitted from the service-providing unmanned aerial vehicle 307 to reduce additional spectrum consumption due to lack of spectrum.

The feeder link station 311 may process all information provided from the LEO satellites 301 through the feeder link 308 to ensure the high connectivity of a system and real-time services.

The offshore base station user 312 is a maritime user located at a preset distance from the coast, and may receive communication services through the offshore base stations 320 rather than the service-providing unmanned aerial vehicle 307.

A satellite gateway 313 is an optical fiber link that connects the feeder link station 311 and the network operator 318, and the LEO satellites 301 may be connected to the network operator 318 through the feeder link 308, the feeder link station 311, and the satellite gateway 313.

The island base stations 314 are means for effectively providing many communication services at sea, and may provide communication services to the island base station user 315 through the relay unmanned aerial vehicle 303.

The island base station user 315 is a maritime user located at a preset distance from the island base stations 314, and may receive communication services through the island base stations 314 rather than the service-providing unmanned aerial vehicle 307.

The unmanned aerial vehicle user 316 may mean a maritime user that receives communication relay services directly from the service-providing unmanned aerial vehicle 307.

A fiber link 317 may mean a channel formed between the network operator 318 and the offshore base stations 320.

The network operator 318 is an organization responsible for operating a network of maritime users, and more specifically, may mean an organization that controls the maritime communication system 300 and provides communication services. For example, the network operator 318 may control a communication relay function and wireless charging of each of the unmanned aerial vehicles 303 and 307 through the unmanned aerial vehicles 303 and 307.

The offshore base stations 320 may be connected to the network operator 318 through the fiber link 317 and may provide communication services to the offshore base station user 312.

FIGS. 4A to 4C are drawings for explaining a method of wirelessly charging an unmanned aerial vehicle included in a maritime communication system according to one embodiment.

Referring to FIGS. 4A to 4C, the maritime communication system according to one embodiment may include one or more unmanned aerial vehicles UAV-A and UAV-B.

According to one aspect of the present disclosure, each of the unmanned aerial vehicles UAV-A and UAV-B may receive location information of a user equipped with a charging station among one or more maritime users every preset period.

In addition, when the power of an equipped battery is less than or equal to a preset threshold, based on location information of a user equipped with a charging station, each of the unmanned aerial vehicles UAV-A and UAV-B may fly to the location of the user equipped with a charging station, and wireless charging of the unmanned aerial vehicles UAV-A and UAV-B may be performed using a charging station.

For example, when the unmanned aerial vehicles UAV-A and UAV-B approach within a preset critical distance, a user equipped with a charging station may transmit, to the unmanned aerial vehicles UAV-A and UAV-B, a control signal for guiding the unmanned aerial vehicles UAV-A and UAV-B to the location of the charging station.

In addition, when the unmanned aerial vehicles UAV-A and UAV-B arrive at the charging station, the user equipped with the charging station may wirelessly charge the batteries of the unmanned aerial vehicles UAV-A and UAV-B.

According to one aspect of the present disclosure, when the power of an equipped battery is less than or equal to a preset threshold, each of the unmanned aerial vehicles UAV-A and UAV-B may transmit a wireless charging request signal to a network operator and may receive a wireless charging feedback signal corresponding thereto.

In addition, upon receiving a wireless charging feedback signal, each of the unmanned aerial vehicles UAV-A and UAV-B may fly to the location of a user equipped with a charging station.

Upon receiving a wireless charging request signal, a network operator may adjust the positions of unmanned aerial vehicles located within a preset distance from the unmanned aerial vehicles UAV-A and UAV-B that transmitted the wireless charging request signal, thereby minimizing a gap in communication relaying due to the absence of the unmanned aerial vehicles UAV-A and UAV-B that transmitted the wireless charging request signal.

In addition, when charging of the unmanned aerial vehicles UAV-A and UAV-B that transmitted the wireless charging request signal is completed, the network operator may adjust the positions of the unmanned aerial vehicles UAV-A and UAV-B and unmanned aerial vehicles within a preset distance again.

Specifically, in step 410, each of the unmanned aerial vehicles UAV-A and UAV-B may receive location information of a user equipped with a charging station every preset period.

In addition, when the power of an equipped battery is less than or equal to a preset threshold, based on location information of a user equipped with a charging station, the unmanned aerial vehicle UAV-A may fly to the location of the user equipped with a wireless charging station and maybe wirelessly charged.

When wireless charging of the unmanned aerial vehicle UAV-A is completed, a network operator may fly the unmanned aerial vehicle UAV-A to the location of the unmanned aerial vehicle UAV-B that requires wireless charging.

In step 420, in place of the unmanned aerial vehicle UAV-B that requires wireless charging due to a decrease in the power of an equipped battery below a preset threshold, the unmanned aerial vehicle UAV-A that has been wirelessly charged may relay communication between a maritime user and satellites, and the unmanned aerial vehicle UAV-B that requires wireless charging may receive location information of a user equipped with a charging station.

In step 430, based on location information of a user equipped with a charging station, the unmanned aerial vehicle UAV-B that requires wireless charging may fly to the location of the user equipped with a wireless charging station and maybe wirelessly charged.

As a result, according to the present disclosure, terrestrial communication and maritime communication may be integrated in an easy way using low earth orbit satellites and an unmanned aerial vehicle.

In addition, low-latency communication between a maritime user and satellites may be realized through relaying using an unmanned aerial vehicle, and an unmanned aerial vehicle may be easily charged in a wireless manner at sea.

According to one embodiment of the present disclosure, terrestrial communication and maritime communication can be integrated in an easy way using low earth orbit satellites and an unmanned aerial vehicle.

According to one embodiment of the present disclosure, low-latency communication between a maritime user and satellites can be realized through relaying using an unmanned aerial vehicle.

According to one embodiment of the present disclosure, an unmanned aerial vehicle can be easily charged wirelessly at sea.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents of the claims are within the scope of the following claims.

DESCRIPTION OF SYMBOLS

| | |
|---|---|
| 100: MARITIME COMMUNICATION SYSTEM | 110: MARITIME USER |
| 120: UNMANNED AERIAL VEHICLE | 130: SATELLITES |

What is claimed is:

1. A maritime communication system, comprising:
   one or more maritime users;
   one or more satellites connected to a network operator; and
   an unmanned aerial vehicle (UAV) for relaying communication between the maritime users and the satellites,
   wherein the unmanned aerial vehicle controls utility of the network based on a free-space path loss value (PLFS) between each of the one or more maritime users and the unmanned aerial vehicle (UAV) constituting a network and a gain value (gi) of a sub-carrier corresponding to a free-space path loss value (PL) of each of the one or more maritime users,
   wherein when a power of an equipped battery of the unmanned aerial vehicle is less than or equal to a preset threshold, the unmanned aerial vehicle transmits a wireless charging request signal to the network operator,
   wherein the network operator adjusts positions of unmanned aerial vehicles located within a preset distance from the unmanned aerial vehicle that transmitted the wireless charging request signal, and
   wherein when charging of the unmanned aerial vehicle that transmitted the wireless charging request signal is completed, the network operator re-adjusts the positions of the charged unmanned aerial vehicle and the unmanned aerial vehicles located within the preset distance from the charged unmanned aerial vehicle.

2. The maritime communication system according to claim 1, wherein the maritime users comprise ships located at sea, and the satellites comprise low earth orbit (LEO) satellites positioned at a low altitude of 1,000 km to 1,400 km.

3. The maritime communication system according to claim 1, wherein the unmanned aerial vehicle monitors status of communication between the maritime users and the satellites.

4. The maritime communication system according to claim 1, wherein the unmanned aerial vehicle receives location information of a user equipped with a charging station among the maritime users every preset period.

5. The maritime communication system according to claim 4, wherein, when the power of the equipped battery is less than or equal to the preset threshold, the unmanned aerial vehicle flies to a location of the user equipped with a charging station based on the location information, and wireless charging of the unmanned aerial vehicle is performed at the location.

6. An unmanned aerial vehicle of a maritime communication system, the unmanned aerial vehicle comprising:
   a user connector for connecting one or more maritime users and a network;
   a satellite connector for connecting one or more satellites and the network; and
   a communication controller for relaying communication between the maritime users and the satellites and monitoring the status of the relayed communication,
   wherein the unmanned aerial vehicle controls utility of the network based on a free-space path loss value (PLFS) between each of the one or more maritime users and the unmanned aerial vehicle constituting a network and a gain value (gi) of a sub-carrier corresponding to a free-space path loss value (PL) of each of the one or more maritime users,
   wherein when a power of an equipped battery of the unmanned aerial vehicle is less than or equal to a preset threshold, the unmanned aerial vehicle transmits a wireless charging request signal to a network operator,
   wherein the network operator adjusts positions of unmanned aerial vehicles located within a preset distance from the unmanned aerial vehicle that transmitted the wireless charging request signal, and
   wherein when charging of the unmanned aerial vehicle that transmitted the wireless charging request signal is completed, the network operator re-adjusts the positions of the charged unmanned aerial vehicle and the unmanned aerial vehicles located within the preset distance from the charged unmanned aerial vehicle.

7. The unmanned aerial vehicle, according to claim 6, wherein the maritime users comprise ships located at sea, and the satellites comprise low earth orbit (LEO) satellites positioned at a low altitude of 1,000 km to 1,400 km.

8. The unmanned aerial vehicle, according to claim 6, wherein the user connector is provided with a multiple-input and multiple-output (MIMO) directional antenna and connects the maritime users and the network through the provided MIMO directional antenna.

9. The unmanned aerial vehicle, according to claim 6, wherein the user connector receives location information of a user equipped with a charging station among the maritime users every preset period.

10. The unmanned aerial vehicle, according to claim 9, further comprising an aerial vehicle controller for generating a flight control signal for flight to a location corresponding to the location information when the power of the equipped battery is less than or equal to the preset threshold.

* * * * *